US009221544B2

(12) United States Patent
Armatorio et al.

(10) Patent No.: US 9,221,544 B2
(45) Date of Patent: Dec. 29, 2015

(54) INTEGRATED SURFACE THERMAL MANAGEMENT SYSTEM

(75) Inventors: Andrew Armatorio, Everett, WA (US);
Richard J. Loftis, Arlington, WA (US);
Daniel A. Burch, Everett, WA (US);
Justin Nuyda, Bothell, WA (US);
Roland J. Olivier, Everett, WA (US);
Yared Shenkoru, Lynwood, WA (US)

(73) Assignee: The Boeing Company, Chicago, IL (US)

( * ) Notice: Subject to any disclaimer, the term of this patent is extended or adjusted under 35 U.S.C. 154(b) by 596 days.

(21) Appl. No.: 13/237,437

(22) Filed: Sep. 20, 2011

(65) Prior Publication Data

US 2013/0068747 A1 Mar. 21, 2013

(51) Int. Cl.
*B60L 1/02* (2006.01)
*B64D 15/12* (2006.01)
*B64D 15/04* (2006.01)
*B64D 15/16* (2006.01)
*B64F 5/00* (2006.01)
*B64D 15/14* (2006.01)
*B64D 15/00* (2006.01)

(52) U.S. Cl.
CPC ............... *B64D 15/14* (2013.01); *B64D 15/00* (2013.01); *B64D 15/12* (2013.01); *H05B 2214/02* (2013.01)

(58) Field of Classification Search
CPC .... H05B 2214/02; B64D 15/00; B64D 15/12; B64D 15/14
USPC ........... 219/200–203, 205; 244/134 R, 134 D
See application file for complete search history.

(56) References Cited

U.S. PATENT DOCUMENTS

| 4,084,126 | A | * | 4/1978 | Clements | ........................... 322/8 |
| 5,597,140 | A | | 1/1997 | Madsen | |
| 5,746,396 | A | | 5/1998 | Thorton-Trump | |
| 6,047,926 | A | | 4/2000 | Stanko et al. | |
| 6,092,765 | A | | 7/2000 | White | |
| 7,157,663 | B1 | | 1/2007 | Kismarton | |
| 7,291,815 | B2 | | 11/2007 | Hubert et al. | |
| 7,708,227 | B2 | | 5/2010 | Al-Khalil | |
| 7,854,412 | B2 | | 12/2010 | Al-Khalil | |
| 2007/0170312 | A1 | | 7/2007 | Al-Khalil | |
| 2008/0179448 | A1 | * | 7/2008 | Layland et al. | ................ 244/1 N |
| 2009/0149997 | A1 | * | 6/2009 | Stothers | ......................... 700/275 |
| 2009/0199569 | A1 | | 8/2009 | Petrenko | |

(Continued)

FOREIGN PATENT DOCUMENTS

| EP | 1845018 A2 | 10/2007 |
| WO | 2007107732 A1 | 9/2007 |

OTHER PUBLICATIONS

PCT International Search Report, Jan. 28, 2013.

*Primary Examiner* — Dana Ross
*Assistant Examiner* — Lindsey C Teaters
(74) *Attorney, Agent, or Firm* — Yee & Associates, P.C.

(57) ABSTRACT

Systems to apply heat to an aircraft surface are disclosed. In some embodiments, heaters are embedded in a composite structure of an aircraft. In one embodiment, a composite aircraft structure comprises a base comprising a plurality of resin impregnated plies, a heating layer adjacent the base, wherein the heating layer comprises at least one heater, an adhesive layer adjacent the heating layer, a lightning protection layer adjacent the heating layer, and an exterior surface layer adjacent the lightning protection layer. Other embodiments may be described.

21 Claims, 4 Drawing Sheets

(56) References Cited

U.S. PATENT DOCUMENTS

| | | |
|---|---|---|
| 2010/0123044 A1 | 5/2010 | Botura |
| 2010/0206990 A1 | 8/2010 | Petrenko |
| 2011/0006049 A1* | 1/2011 | Thompson, Jr. .............. 219/202 |
| 2011/0024409 A1 | 2/2011 | Shah et al. |

* cited by examiner

INTEGRATED SURFACE THERMAL MANAGEMENT SYSTEM

BACKGROUND

Aircraft include flight surfaces (e.g., a wings, stabilizers and control surfaces) and movable control surfaces for directional control in flight. Such control surfaces can include ailerons for roll control, elevators for pitch control, and rudders for yaw control.

In winter conditions flight surfaces and control surfaces may become coated with ice, particularly during layovers on the ground. Present deicing techniques for aircraft include spraying a heated glycol-based solution on the aircraft to clear ice from the flight surfaces and control surfaces and/or exposing the aircraft to infrared (IR) radiation heaters. Such deicing techniques are expensive and time consuming, and contribute to delays in airport efficiency. Accordingly, additional techniques to deice aircraft surfaces may find utility.

SUMMARY

Embodiments of systems and methods in accordance with the present disclosure may provide improved systems and methods to apply heat to aircraft structures. More specifically, embodiments described herein provide for the construction of aircraft structures which may incorporate integrated heating elements and for methods to apply heat to the structures using the heating elements.

In one embodiment, a composite aircraft structure comprises a base comprising a plurality of resin impregnated plies, a heating layer adjacent the base, wherein the heating layer comprises at least one heater, an adhesive layer adjacent the heating layer, a lightning protection layer adjacent the heating layer, and an exterior surface layer adjacent the lightning protection layer.

In another embodiment, an aircraft comprises a fuselage and at least one composite aircraft structure, comprising a base comprising a plurality of resin impregnated plies, a heating layer adjacent the base, wherein the heating layer comprises at least one heater, an adhesive layer adjacent the heating layer, a lightning protection layer adjacent the heating layer, and an exterior surface layer adjacent the lightning protection layer. The lightning protection layer may be combined with the heating layer.

In yet another embodiment, a method to apply heat to an aircraft structure comprises receiving, in a power input panel, electrical power from a power source, generating, in a control panel coupled to the power input panel, at least one heat setting signal representing a desired heat setting for at least one heater embedded in the aircraft structure, receiving, in a regulator module, at least one heat setting signal from the control panel and a temperature signal from at least one heater and, generating, in the regulator module, an output signal representing a difference between at least one heat setting signal and the temperature signal, and directing the output signal to at least one heater embedded in the aircraft structure to regulate a current flow through the heater.

Further areas of applicability will become apparent from the description provided herein. It should be understood that the description and specific examples are intended for purposes of illustration only and are not intended to limit the scope of the present disclosure or application of the technology.

BRIEF DESCRIPTION OF THE DRAWINGS

Embodiments of methods and systems in accordance with the teachings of the present disclosure are described in detail below with reference to the following drawings.

DETAILED DESCRIPTION

Systems and methods to for thermal management on aircraft structures are described herein. Specific details of certain embodiments are set forth in the following description and in FIGS. 1-3 to provide a thorough understanding of such embodiments. One skilled in the art will understand, however, that alternate embodiments may be practiced without several of the details described in the following description.

Figure 1:
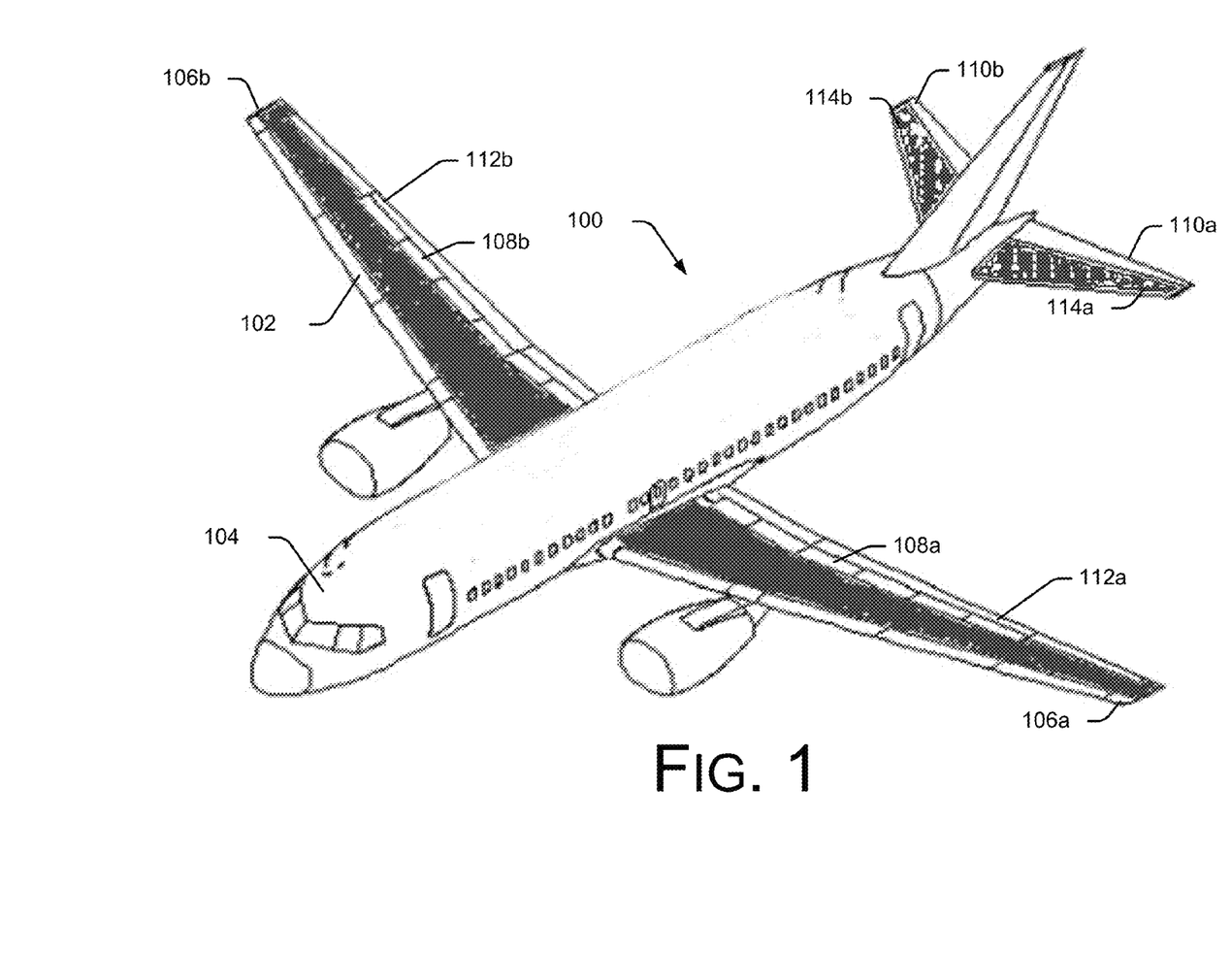
FIG. 1 is a schematic, perspective view of an aircraft having an integrated surface thermal management system in accordance with embodiments.

FIG. 1 is a partially schematic, top view of an aircraft 100 having one or more control, lifting and actuation surfaces 102 configured in accordance with an embodiment of the invention. In one aspect of this embodiment, the aircraft 100 includes a fuselage 104, forward wings 106 (shown as first and second wings 106a and 106b) and horizontal stabilizer 114 (shown as first and second wings 114a, and 114b) fixedly attached to the fuselage. Each wing 106 can include a number of movable control surfaces for controlling the aircraft 100 during flight. These control surfaces may include flaperons 108a, 108b, collectively referred to by reference numeral 108, elevators 110a, 110b, collectively referred to as 110, and ailerons 112a, 112b, collectively referred to as 112. In operation, a flight control actuation system can extend or retract linear actuators to deflect the elevators up or down, which actions cause the aircraft to pitch nose up or down. Similarly, the ailerons, rudder, flaperons, and spoilers, may be deflected to generate the desired effects on the airplane.

In accordance with embodiments described herein, portions of the wings 106, horizontal stabilizer 114, fuselage 104 or other aircraft structures may be formed from a composite construction and may include heating elements integrated into the composite structure of the wings 106 or, horizontal stabilizer 114 to define heated regions, which are illustrated in shading in FIG. 1.

Figure 2:
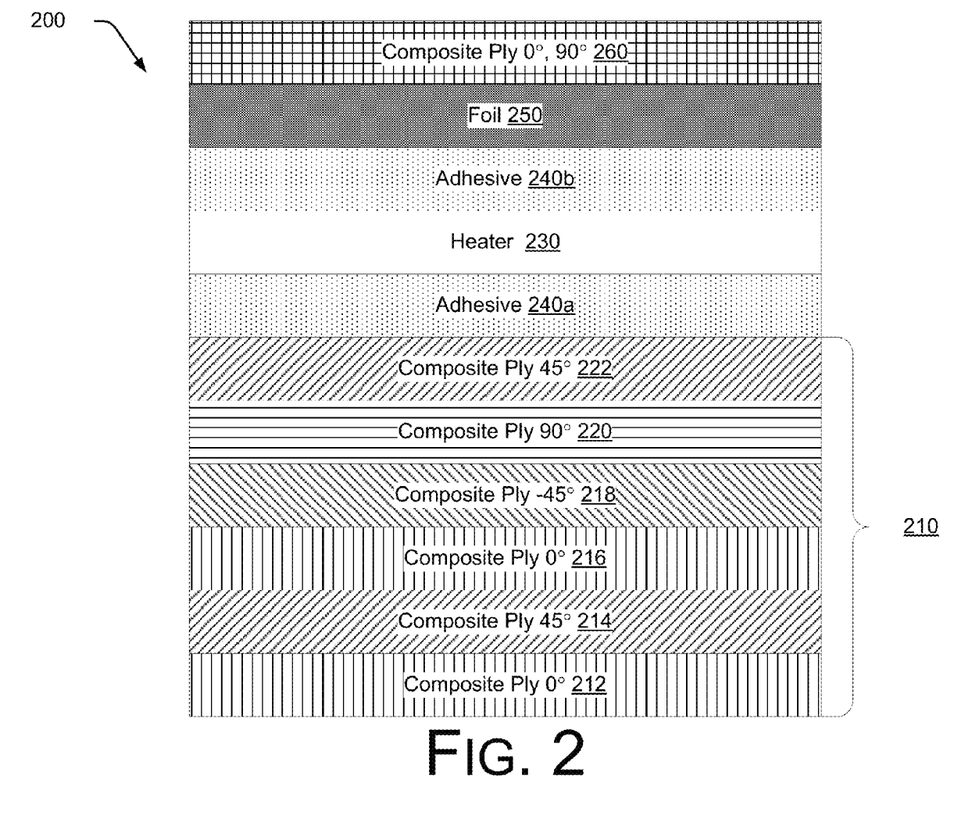
FIG. 2 is a schematic, cross-sectional illustration of an aircraft structure adapted to include a heating layer, according to embodiments.

FIG. 2 is a schematic, cross-sectional illustration of an aircraft structure 200 adapted to include a heating layer, according to embodiments. In some embodiments the structure 200 may be an aircraft wing such as one of the wings 106 or horizontal stabilizer 114. In other embodiments the aircraft structure may be a fuselage such as fuselage 104. Referring to FIG. 2, in some embodiments the structure 200 comprises a base section 210 which is formed from a plurality of resin impregnated plies. In the embodiment depicted in FIG. 2 the base includes six layers of composite resin plies which are arranged in different orientations. including a first layer 212 in which the fibers are disposed at an orientation of zero degrees (0°) with respect to a reference axis, a second layer 214 in which the fibers are disposed at an orientation of forty-five degrees (45°) with respect to the reference axis, a third layer 216 in which the fibers are disposed at an orientation of zero degrees (0°) with respect to the reference axis, a fourth layer 218 in which the fibers are disposed at an orientation of negative forty-five degrees (−45°) with respect to the reference axis, a fifth layer 220 in which the fibers are disposed at an orientation of ninety degrees (90°) with respect to the reference axis, and a sixth layer 222 in which the fibers are disposed at an orientation of forty-five degrees (45°) with respect to the reference axis. One skilled in the art will recognize that the base depicted in FIG. 2 is merely exemplary; and that other ply materials and orientations may be used.

It will be appreciated that a variety of alternate embodiments can be conceived, and that the base section 210 is not limited to the particular embodiment shown in FIG. 2. For example, in alternate embodiments, the base section 210 may have a greater or fewer number of composite layers than are shown in FIG. 2. For example, while the base section 210 in FIG. 2 includes a total of six composite layers oriented in an alternating manner, in alternate embodiments, additional composite layers may be added either asymmetrically or symmetrically, with the result that the base section 210 may be a symmetric or an asymmetric section. Furthermore, the reinforcing fibers in the layers composite component may be oriented in any desired manner, and are not limited to the particular angular values and materials described above and shown in FIG. 2.

A heating layer 230 is disposed adjacent the base 210. In some embodiments the heating layer 230 may comprise a plurality of heating elements. By way of example, heating elements may be embodied as heaters encased in a sheeting material such as an Omega KH-405/5 resistive heating element manufactured and distributed by Omega.

One or more layers of adhesive 240a, 240b, may be disposed adjacent the heater 230. In some embodiments the adhesive may be embodied as a nylon adhesive such as a BMS/160 nylon adhesive.

A layer of conductive foil 250 may be disposed adjacent the adhesive layer 240 or the heater. In some embodiments the conductive foil 250 may be embodied as a conductive mesh or prepreg incorporating copper, bronze or other conductive foil or mesh. The conductive foil is not related to the operation of the heating elements, but is often used for lightning strike protection. Other techniques for lightning strike protection may be used alone or in conjunction with conductive foils. Lightning protection foil may be combined with the heater. All layers may be combined in any layup order. Any two or more layers may be combined into a single layer. Any layer may not be used over the entire structure.

A layer of ply material (e.g. fiberglass) 260 may be disposed adjacent to the foil 250, or the heater or the adhesive. In the embodiment depicted in FIG. 2 the ply material 260 includes fibers oriented in multiple directions with respect to the reference axis.

An aircraft structure in accordance with the embodiment depicted in FIG. 2 may be constructed in accordance with composite manufacturing techniques such as the techniques described in commonly assigned U.S. Patent Publication No. 20060272143 to Kismarton, entitled Methods and Systems for Manufacturing Composite Components and U.S. Pat. No. 7,968,169, to Gleason, et al, entitled Compound Contoured Composite Beams and Fabrication Methods, the disclosures of which are incorporated herein by reference in their respective entireties. In general, the respective layers, or plies, are laid up against a tool formed in the shape of the structure, e.g., a wing section, a section of a fuselage, or the like, and cured.

Figure 3:
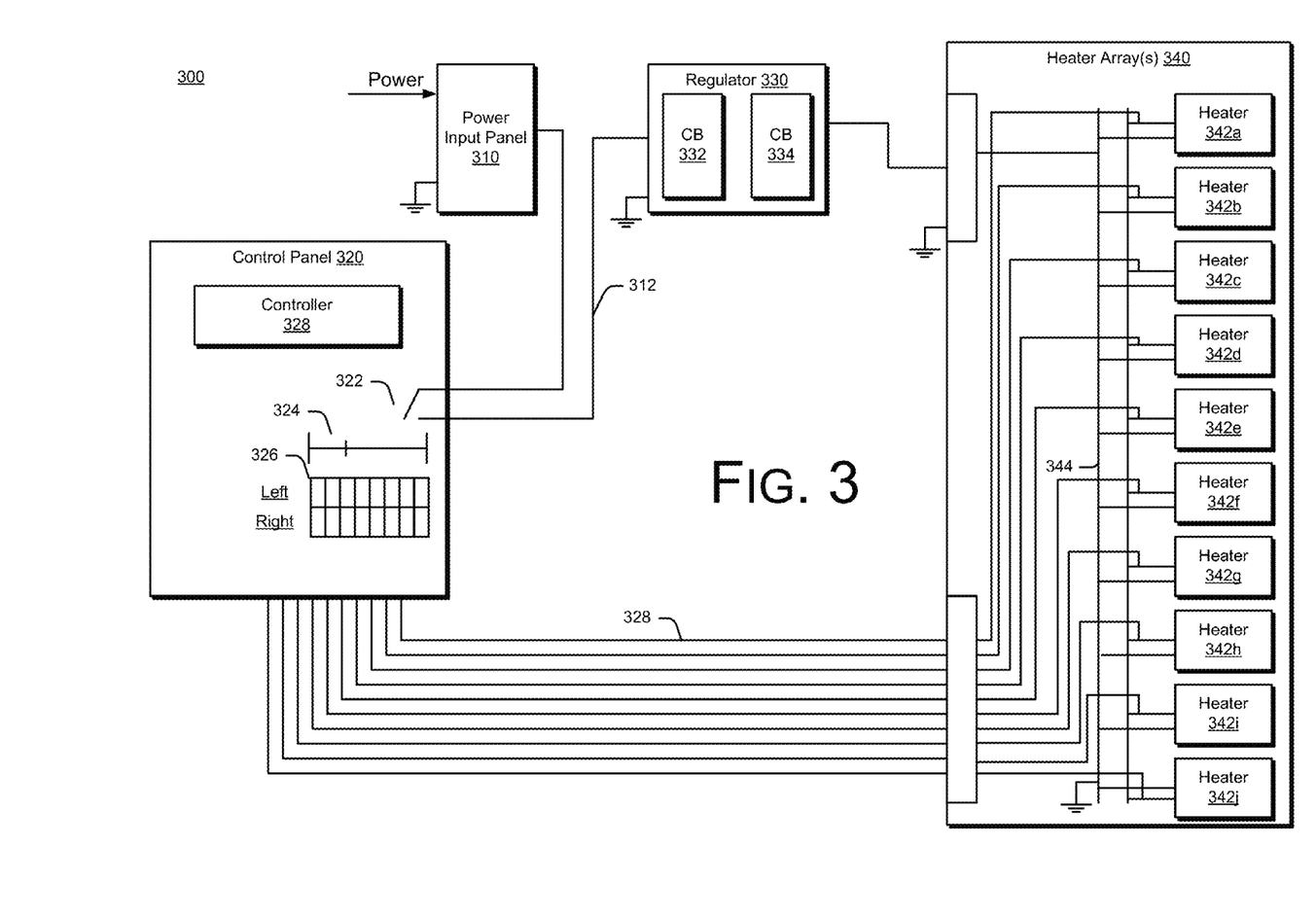
FIG. 3 is a schematic illustration of a control circuit which may be used with an integrated surface thermal management system, according to embodiments.

The heaters on a finished aircraft structure may be coupled to a control circuit to manage heat transfer operations. FIG. 3 is a schematic illustration of an integrated surface thermal management system 300, according to embodiments. Referring to FIG. 3, in some embodiments the system 300 comprises an input power panel 310, a control panel 320, a regulator, 330, and a heater array 340 comprising a plurality of heaters 342a-342j coupled by a bus network 344. In use, the system 300 may be installed on an aircraft such that one or more heater arrays 340 are disposed on the wings of the aircraft, as depicted in FIG. 1, or on portions of the fuselage or on control surfaces of the aircraft.

Power input panel 310 may be configured to accept power input from a ground-based power source, for example a portable power unit or a ground-based power supply coupled to an aircraft gate, when the aircraft is on the ground. By contrast, when the aircraft is in flight input power panel 310 may receive power from the aircraft's generator. Power input panel 310 is coupled to control panel 320 and regulator 330 via circuit 312.

Control panel 320 may be mounted on the flight deck or elsewhere and may comprise a switch 322 in which selectively opens and closes circuit 312 to enable and disable current flow through circuit 312. Control panel 320 may further comprise an input device 324 to generate a heat setting signal based on an input from a user of the system 300. In the embodiment depicted in FIG. 3 the input device is embodied as a pin slideable along an axis. However, other input devices, e.g., buttons, touch screens, etc., may be used. The specific input device is not critical. Control panel 320 further comprises controller 328 and a display panel 326 to provide an indication of the state of heaters 342. Control panel 320 is coupled to one or more heater arrays 340 via lines 328, which carry control signals between control panel 320 and heaters 342a-342j.

When the switch 322 is closed, power from the power source flows through circuit 312 to regulator 330. Regulator 330 may include one or more temperature-sensitive circuit breakers 332, 334. In normal operating circumstances circuit breakers 332, 334 remain closed to provide electrical power to heating array(s) 340. However, in the event a temperature proximate to a heater 342 exceeds a threshold then one or more of the circuit breakers may be tripped to stop the flow of electrical power to heating array(s) 340. Electrical power from regulator 330 is directed to one or more heater arrays 340, and directed to individual heaters 342a-342j by bus network 344.

Figure 4:
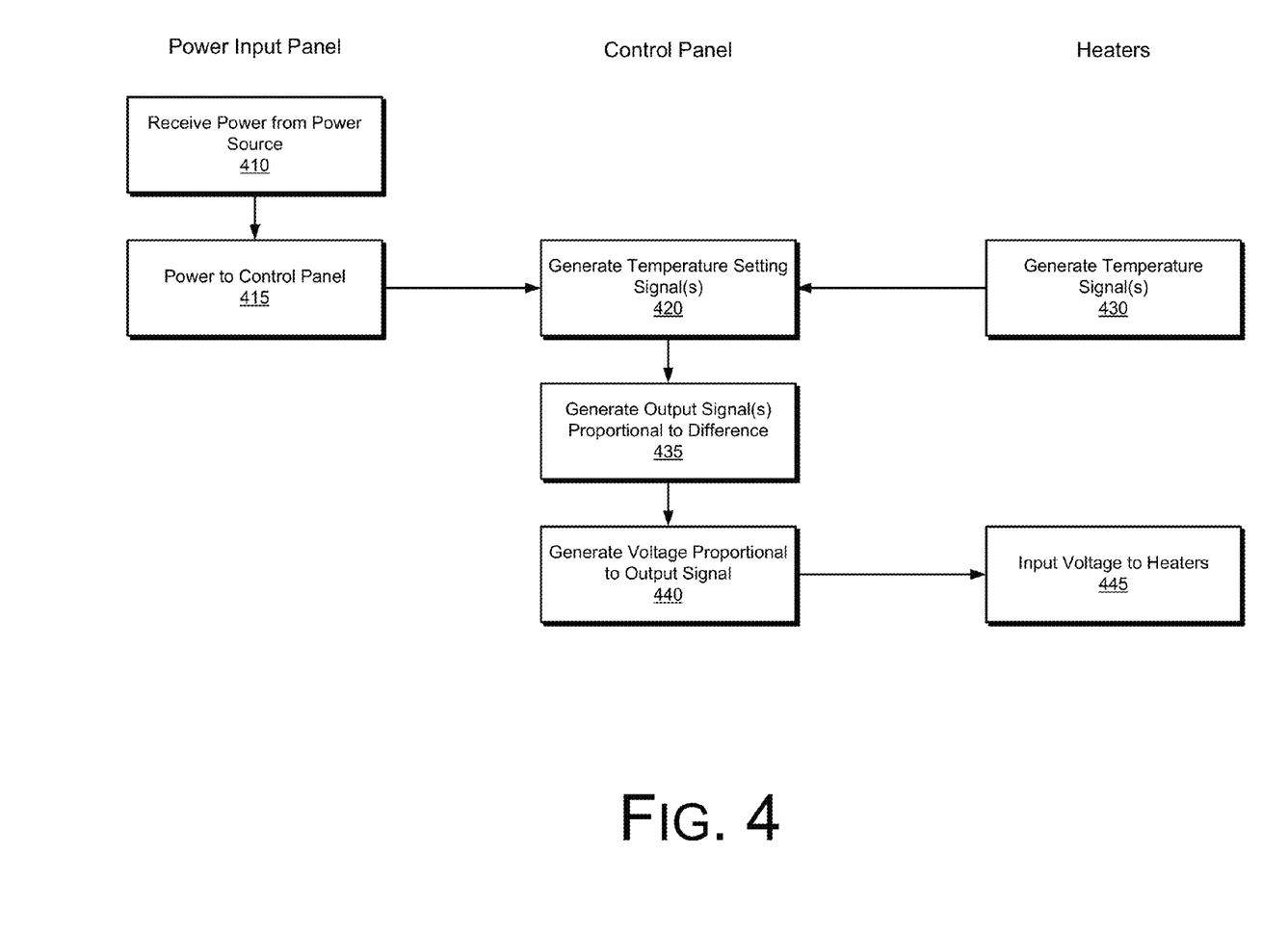
FIG. 4 is a flowchart illustrating high-level operations of a method to heat an aircraft structure, according to embodiments.

In operation, the system 300 implements a process to heat an aircraft structure. FIG. 4 is a flowchart illustrating high-level operations of a method to heat an aircraft structure, according to embodiments. Referring to FIG. 4, at operation 410 the power input panel 310 receives electrical power from a power source. As described above, the power source may be either external or internal. When switch 322 is closed, power from the power source flows to control panel 320 (operation 415). Some or all of the functions of the power panel 310, control panel 320 and regulator 330 may be combined in a single or multiple unit system.

At operation 420 the control panel generates one or more temperature setting signals. In some embodiments a user of the system 300 directs the control panel to generate a temperature setting signal using the input device 324. In some embodiments a single input device 324 generates a single temperature setting signal applicable to the entire system 300. In other embodiments the input device may generate discrete signals for individual heaters 342.

Heaters 342 may include a thermistor, thermocouple, or other device to output a voltage that is proportional to a temperature proximate to the heater. In some embodiments each heater 342a-342j generates an independent signal which is transmitted to the control panel on one of the lines 328 (operation 430). In alternate embodiments the heater array 340 may generate a single temperature signal or may integrate a plurality of temperature signals from temperature sensors proximate to the heater array 340.

At operation 435 the controller in the control panel generates one or more output signals that are proportional to a difference between the temperature setting signals generated in response to the input device and the temperature signals from the heaters 342. The output signals may be converted to a voltage (operation 440) and placed on lines 328, such that the voltage is input (operation 445) to the respective heaters 342a-342j to drive the heaters 342a-342j.

The operations depicted in FIG. 4 may be embodied as logic executable in controller 328 such that controller 328 may continuously monitor and regulate the temperature of heaters 342a-342 to apply heat to an aircraft structure. In some embodiments the logic may be implemented as logic instructions which may be stored in a computer-readable memory, e.g., software, and executed by a processing device. In other embodiments the logic may be reduced to firmware or even to hardwired circuitry. Thus, described herein are multilayer, composite structures which comprise an integrated heating layer and a control system which may be coupled to the integrated heating layer to selectively apply heat to the aircraft structure. The heating layer and control system may used in any composite or non-composite structure, fixed or moveable, whether in flight or on/under the surface.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Various functional components of the system 300 may be implemented as logic instructions which may be executed on a general purpose processor or on a configurable flight control electronics. By way of example, in some embodiments the operations depicted in FIG. 4 may be implemented as logic instructions executable on the controller 328 of control panel 320. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

For example, in some embodiments a computer program product may comprise logic instructions stored on a computer-readable medium which, when executed, configure a flight control electronics to detect whether a system management memory module is in a visible state, in response to a determination that system management memory is in a visible state, direct one or more system management memory input/output operations to a system management memory module, and in response to a determination that system management memory is in an invisible state, direct system management memory cache write back operations to the system management memory module and direct other system management memory input/output operations to another location in a system memory.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment. In the foregoing discussion, specific implementations of exemplary processes have been described, however, it should be understood that in alternate implementations, certain acts need not be performed in the order described above. In alternate embodiments, some acts may be modified, performed in a different order, or may be omitted entirely, depending on the circumstances. Moreover, in various alternate implementations, the acts described may be implemented by a computer, flight control electronics, processor, programmable device, firmware, or any other suitable device, and may be based on instructions stored on one or more computer-readable media or otherwise stored or programmed into such devices (e.g. including transmitting computer-readable instructions in real time to such devices). In the context of software, the acts described above may represent computer instructions that, when executed by one or more processors, perform the recited operations. In the event that computer-readable media are used, the computer-readable media can be any available media that can be accessed by a device to implement the instructions stored thereon.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A system comprising:
an aircraft on a ground, the aircraft including a composite aircraft structure comprising:
a base comprising a plurality of composite plies;
a heating layer adjacent the base, wherein the heating layer comprises at least one resistive heating element; and
a power input panel configured to receive power for the resistive heating element;
a ground-based power source connected to the power input panel;
a voltage regulator configured to regulate electrical power from the ground-based power source, the voltage regulator including a temperature-sensitive circuit breaker that stops a flow of electrical power to the at least one resistive heating element embedded in the aircraft structure when a temperature proximate to the at least one resistive heating element exceeds a threshold; and
a sensor included with the heating layer and configured to supply a signal indicating a measured temperature to the temperature-sensitive circuit breaker.

2. The system of claim 1, wherein the composite aircraft structure further comprises:
a first adhesive layer adjacent the heating layer;
a lightning protection layer adjacent the heating layer;
an exterior surface layer adjacent the lightning protection layer; and
a second adhesive layer adjacent the heating layer and opposite the first adhesive layer, the plurality of composite plies adjacent the second adhesive layer.

3. The system of claim 1, wherein the plurality of composite plies are arranged in a plurality of different orientations.

4. The system of claim 1, wherein the heating layer comprises a plurality of separately controllable heating elements.

5. The system of claim 1, further comprising a control circuit, wherein the control circuit comprises:
a control panel coupled to the power input panel to generate at least one heat setting signal representing a desired heat setting for at least one heater; and
a regulator module to:
receive at least one heat setting signal from the control panel;
receive a temperature signal from at least one heater and;
generate an output signal representing a difference between the at least one heat setting signal and the temperature signal.

6. The system of claim 5, wherein the output signal is fed back to the at least one heater to regulate a current flow through the at least one heater.

7. The system of claim 1, wherein the composite aircraft structure forms a portion between a leading edge and a trailing edge of one or more of a wing and a horizontal stabilizer of the aircraft.

8. An aircraft, comprising:
a fuselage;
at least one composite aircraft structure, comprising:
a base comprising a plurality of composite plies; and
a heating layer adjacent the base, wherein the heating layer comprises at least one resistive heating element;
a power input panel configured to receive power for the resistive heating element, wherein the power input panel is configured to receive power from both an on-ground power source and an internal power source of the aircraft;
a voltage regulator configured to regulate electrical power from the on-ground power source and the internal power source, the voltage regulator including a temperature-sensitive circuit breaker that stops a flow of electrical power to the at least one resistive heating element embedded in the aircraft structure when a temperature proximate to the at least one resistive heating element exceeds a threshold; and
a sensor included with the heating layer and configured to supply a signal indicating a measured temperature to the temperature-sensitive circuit breaker.

9. The aircraft of claim 8, wherein the at least one composite aircraft structure further comprises:
a first adhesive layer adjacent the heating layer;
a lightning protection layer adjacent the heating layer;
an exterior surface layer adjacent the lightning protection layer; and
a second adhesive layer adjacent the heating layer and opposite the first adhesive layer, the plurality of composite plies adjacent the second adhesive layer.

10. The aircraft of claim 8, wherein the plurality of composite plies are arranged in a plurality of different orientations.

11. The aircraft of claim 8, wherein the heating layer comprises a plurality of separately controllable sealed heating elements.

12. The aircraft of claim 11, further comprising a control circuit, wherein the control circuit comprises:
a control panel coupled to the power input panel to generate at least one heat setting signal representing a desired heat setting for at least one heater; and
a regulator module configured to:
receive at least one heat setting signal from the control panel;
receive a temperature signal from at least one heater; and
generate an output signal representing a difference between at least one heat setting signal and the temperature signal.

13. The aircraft of claim 12, wherein the output signal is fed back to the at least one heater to regulate a current flow through the at least one heater.

14. A method to apply heat to a composite aircraft structure of an aircraft while the aircraft is on a ground, comprising:
receiving, in a power input panel, electrical power from ground-based power source;
generating, in a control panel coupled to the power input panel, at least one heat setting signal representing a desired heat setting for at least one heater embedded in the aircraft structure;
receiving, in a regulator module, at least one heat setting signal from the control panel and a temperature signal from at least one heater and;
generating, in the regulator module, an output signal representing a difference between at least one heat setting signal and the temperature signal;
directing the output signal to the at least one heater embedded in the aircraft structure to regulate a current flow through the at least one heater; and
tripping at least one temperature-sensitive circuit breaker to stop a flow of electrical power to the at least one heater embedded in the aircraft structure when a temperature proximate to the at least one heater exceeds a threshold.

15. The method of claim 14, wherein receiving, in a power input panel, electrical power from a power source comprises receiving electrical power from a remote power source coupled to the power input panel.

16. The method of claim 14, wherein generating, in a control panel coupled to the power input panel, at least one heat setting signal comprises receiving an input from an input device on the control panel.

17. The method of claim 14, wherein generating, in the regulator module, an output signal representing a difference between at least one heat setting signal and the temperature signal comprises subtracting the output signal from the heat setting signal.

18. The method of claim 14, further comprising presenting on the control panel, an indicator of a temperature proximate to at least one heater.

19. The method of claim 14, wherein composite aircraft structure comprises:
   a base comprising a plurality of composite plies; and
   a heating layer adjacent the base, wherein the heating layer comprises at least one heater.

20. The method of claim 19, wherein composite aircraft structure further comprises:
   a first adhesive layer adjacent the heating layer;
   a lightning protection layer adjacent the heating layer;
   an exterior surface layer adjacent the lightning protection layer; and
   a second adhesive layer adjacent the heating layer and opposite the first adhesive layer, the plurality of composite plies adjacent the second adhesive layer.

21. An aircraft comprising:
   a composite aircraft structure comprising:
      a base section comprising:
         a first composite ply with fibers disposed at an orientation of zero degrees with respect to a reference axis;
         a second composite ply disposed on the first composite ply and with fibers at an orientation of forty-five degrees with respect to the reference axis;
         a third composite ply disposed on the second composite ply and with fibers at an orientation of zero degrees with respect to the reference axis;
         a fourth composite ply disposed on the third composite ply and with fibers at an orientation of negative forty-five degrees with respect to the reference axis;
         a fifth composite ply disposed on the fourth composite ply and with fibers at an orientation of ninety degrees with respect to the reference axis; and
         a sixth composite ply disposed on the fifth composite ply and with fibers at an orientation of forty-five degrees with respect to the reference axis;
      a first adhesive layer disposed on the base section;
      a heating layer disposed on the first adhesive layer, the heating layer comprising at least one resistive heating element;
      a second adhesive layer disposed on the heating layer;
      a lightning protection layer disposed on the second adhesive layer; and
      a seventh composite ply disposed on the lightning protection layer with fibers in multiple directions with respect to the reference axis;
   a power input panel, wherein the at least one resistive heating element is configured to receive power from a ground-based power source and a generator of the aircraft via the power input panel;
   a control panel mounted on a flight deck of the aircraft and coupled to the at least one resistive heating element via at least one control signal line, the control panel comprising:
      an input device to generate a heat setting for the at least one resistive heating element; and
      a display panel to provide an indication of a state of the at least one resistive heating element;
   a voltage regulator configured to regulate electrical power for the at least one resistive heating element, the voltage regulator including a temperature-sensitive circuit breaker; and
   a sensor included with the heating layer and configured to supply a signal indicating a measured temperature to the temperature-sensitive circuit breaker;
   wherein the composite aircraft structure forms a portion between a leading edge and a trailing edge of one or more of a wing and a horizontal stabilizer of the aircraft.

* * * * *